(12) United States Patent
Isono et al.

(10) Patent No.: US 7,770,472 B2
(45) Date of Patent: Aug. 10, 2010

(54) DEVICE FOR DETECTING AMOUNT OF PEDAL OPERATION

(75) Inventors: Hiroshi Isono, Mishima (JP); Noboru Fujiwara, Toyota (JP)

(73) Assignees: Toyota Jidosha Kabushiki Kaisha, Toyota-shi (JP); Toyoda Iron Works Co., Ltd., Toyota-shi (JP)

( * ) Notice: Subject to any disclaimer, the term of this patent is extended or adjusted under 35 U.S.C. 154(b) by 94 days.

(21) Appl. No.: 12/160,134

(22) PCT Filed: Nov. 14, 2007

(86) PCT No.: PCT/JP2007/072110

§ 371 (c)(1),
(2), (4) Date: Jul. 7, 2008

(87) PCT Pub. No.: WO2008/059886

PCT Pub. Date: May 22, 2008

(65) Prior Publication Data

US 2009/0049932 A1    Feb. 26, 2009

(30) Foreign Application Priority Data

Nov. 15, 2006 (JP) ............................. 2006-309646
Oct. 3, 2007 (JP) ............................. 2007-260128

(51) Int. Cl.
*G01L 1/10* (2006.01)

(52) U.S. Cl. ................................. 73/862.625

(58) Field of Classification Search ................................
73/862.621–862.642
See application file for complete search history.

(56) References Cited

U.S. PATENT DOCUMENTS

| 5,217,280 | A  | * | 6/1993 | Nykerk et al. | 303/3 |
| 5,563,355 | A  |   | 10/1996 | Pluta et al. | |
| 6,684,987 | B2 | * | 2/2004 | Stachowski et al. | 188/156 |
| 2008/0098873 | A1 | * | 5/2008 | Kitagawa | 84/422.1 |

FOREIGN PATENT DOCUMENTS

| JP | 1 68517 | 5/1989 |
| JP | 10 329668 | 12/1998 |
| JP | 11 255084 | 9/1999 |
| JP | 2000 168532 | 6/2000 |
| JP | 2001 18768 | 1/2001 |
| JP | 2001 39276 | 2/2001 |
| JP | 2001 206205 | 7/2001 |
| JP | 2001 334919 | 12/2001 |

* cited by examiner

*Primary Examiner*—Max Noori
(74) *Attorney, Agent, or Firm*—Oblon, Spivak, McClelland, Maier & Neustadt, L.L.P.

(57) ABSTRACT

In a pedal operation amount detecting apparatus, a brake pedal and a clevis secured at an end portion of an operating rod are pivotably connected by a connecting shaft, a bush is arranged between the brake pedal and the connecting shaft, detectors are attached on an outer circumferential surface of an elastically deformable bush main body of the bush, and an ECU calculates a pedal tread force based on loads detected by the detectors, whereby a simplified structure, an improved mountainability, and a highly accurate detection of an operation amount can be realized.

12 Claims, 7 Drawing Sheets

DEVICE FOR DETECTING AMOUNT OF PEDAL OPERATION

TECHNICAL FIELD

The present invention relates to a pedal operation amount detecting apparatus that detects a pedal operation amount which is transmitted to an operation target unit through conversion of a pivot operation of an operation pedal into a linear operation of an operating rod.

BACKGROUND ART

For example, an Electronically Controlled Brake (ECB) is known as a braking apparatus of a vehicle, in particular, as an electronically-controlled braking apparatus which electrically controls a braking force applied by the braking apparatus, i.e., a braking oil pressure supplied to a wheel cylinder that drives the braking apparatus, according to an operation amount (such as a pedal stroke and a tread force) input from a brake pedal.

The ECB stores oil pressure increased by a pump in an accumulator and supplies a regulated pressure as a braking oil pressure to the wheel cylinder according to a braking request of an operator. More specifically, when the operator treads on the brake pedal, the master cylinder generates an oil pressure corresponding to the operation amount of the brake pedal. At the same time, a fraction of an operating oil flows into a stroke simulator to regulate the operation amount of the brake pedal corresponding to the tread force of the brake pedal. On the other hand, a brake ECU sets a target decelerated speed of the vehicle according to the pedal stroke, determines distribution of braking forces to be applied to wheels, and supplies a predetermined oil pressure to each wheel cylinder from the accumulator.

In the electronically controlled braking apparatus as described above, the operation amount (such as a pedal stroke and a tread force) input from the brake pedal is required to be detected with high accuracy. Patent Document 1 mentioned below describes one conventional apparatus for detecting an operation amount of a brake pedal.

In a braking apparatus described in Patent Document 1 mentioned below, a brake pedal has an upper end portion pivotably supported by a vehicle body and a middle portion pivotably connected to an end portion of an input rod via a clevis, and a pivot lever is pivotably arranged and holds a tread-force switch so that an end portion of the pivot lever can push a movable rod of the tread-force switch. An operation of the brake pedal makes the pivot lever pivot and push the movable rod of the tread-force switch, whereby a pedal force can be detected.

Patent Document 1: Japanese Patent Application Laid-open No. 2000-168532

DISCLOSURE OF INVENTION

Problem to be Solved by the Invention

The conventional apparatus mentioned above which detects the operation amount of the brake pedal in the braking apparatus requires the pivot lever to transmit an operating force of the brake pedal to the tread-force switch, whereby the structure becomes complicated and manufacturing cost increases. In addition, for a highly-accurate detection of the pedal tread force, high manufacturing accuracy and assembly accuracy of the pivot lever must be secured and mountainability is compromised.

The present invention is made to solve the problems as described above, and an object of the present invention is to provide a pedal operation amount detecting apparatus which can realize a simplified structure, an improved mountainability, and highly-accurate detection of the operation amount.

Means for Solving Problem

To solve the problems as described above and to achieve an object, a pedal operation amount detecting apparatus according to the present invention is a pedal operation amount detecting apparatus that detects a pedal operation amount which is transmitted to an operation target unit as a pivot operation of an operation pedal is converted into a linear operation of an operating rod, and includes a connecting member that connects the operation pedal and the operating rod, a load detecting unit that is arranged between the operation pedal and the connecting member or between the connecting member and the operating rod to detect a load applied therebetween, a phase obtaining unit that obtains a phase in a pivoting direction of the operation pedal in the load detecting unit, and a pedal operation amount calculating unit that calculates the pedal operation amount based on the load detected by the load detecting unit and the phase obtained by the phase obtaining unit.

In the pedal operation amount detecting apparatus according to the present invention, the load detecting unit detects a load applied to a portion where the operation pedal and the connecting member contact with each other or a portion where connecting member and the operating rod contact with each other.

In the pedal operation amount detecting apparatus according to the present invention, the connecting member is a connecting shaft connecting the operation pedal and a clevis secured at an end portion of the operating rod, the load detecting unit detects a load at plural different positions in a circumferential direction of the connecting shaft, the phase obtaining unit obtains a phase difference at the plural different positions where the load is detected, and the pedal operation amount calculating unit calculates the pedal operation amount based on the loads at the plural positions and the phase difference therebetween.

In the pedal operation amount detecting apparatus according to the present invention, the load detecting unit is arranged at plural positions at 90° intervals in the circumferential direction of the connecting shaft.

In the pedal operation amount detecting apparatus according to the present invention, the phase obtaining unit is configured with a pedal displacement amount detecting unit which detects an amount of displacement of the operation pedal, the pedal operation amount calculating unit calculates the pedal operation amount based on the load detected by the load detecting unit and the pedal displacement amount detected by the pedal displacement amount detecting unit.

In the pedal operation amount detecting apparatus according to the present invention, the connecting member is a connecting shaft connecting the operation pedal and the clevis secured at the end portion of the operating rod, and the load detecting unit is arranged at plural positions at 180° intervals in the circumferential direction of the connecting shaft.

In the pedal operation amount detecting apparatus according to the present invention, the load detecting unit is arranged at least at two positions on opposite sides across a load input position of the operating rod in the circumferential direction of the connecting shaft with an arrangement angle therebetween equal to or larger than a maximum pivot operating angle of the operation pedal.

In the pedal operation amount detecting apparatus according to the present invention, the load detecting unit is arranged at two positions with an arrangement angle therebetween being equal to or smaller than 45° in the circumferential direction of the connecting shaft, and the pedal operation amount calculating unit calculates the pedal operation amount according to root-mean-eighth based on the load detected by the load detecting unit at plural positions and the phase difference obtained by the phase obtaining unit.

EFFECT OF THE INVENTION

According to the pedal operation amount detecting apparatus according to the present invention, the operation pedal and the operating rod are connected with each other by the connecting member, and the pedal operation amount detecting apparatus includes the load detecting unit that is arranged between the operation pedal and the connecting member or between the connecting member and the operating rod to detect a load applied therebetween, the phase obtaining unit that obtains a phase in the pivoting direction of the operation pedal in the load detecting unit, and the pedal operation amount calculating unit that calculates the pedal operation amount based on the load and the phase. When the operation pedal is operated, the load detecting unit detects the load applied between the operation pedal and the connecting member or the load applied between the connecting member and the operating rod, the phase obtaining unit obtains a phase in the load detecting unit, and the pedal operation amount calculating unit calculates the pedal operation amount based on the detected load and the obtained phase. Therefore, an additional member is not required for transmitting the operation amount of the operation pedal to the load detecting unit, whereby a simplified structure, improved mountainability, and highly-accurate detection of the operation amount can be realized.

EXPLANATIONS OF LETTERS OR NUMERALS

11 Brake pedal (Operation pedal)
15 Operating rod
16 Clevis
18 Connecting shaft (Connecting member)
21 Connecting hole
22 Bush
24a, 24b, 25a, 25b, 31, 32 Detector (Load detecting unit)
26 Electronic control unit (ECU; Operation amount calculating unit)
33 Pedal-operation-angle sensor (Pivoting angle detecting unit)

BEST MODE(S) FOR CARRYING OUT THE INVENTION

Exemplary embodiments of a pedal operation amount detecting apparatus according to the present invention will be described in detail below with reference to the accompanying drawings. It should be noted, however, that the present invention is not limited by the embodiments.

First Embodiment

Figure 1:
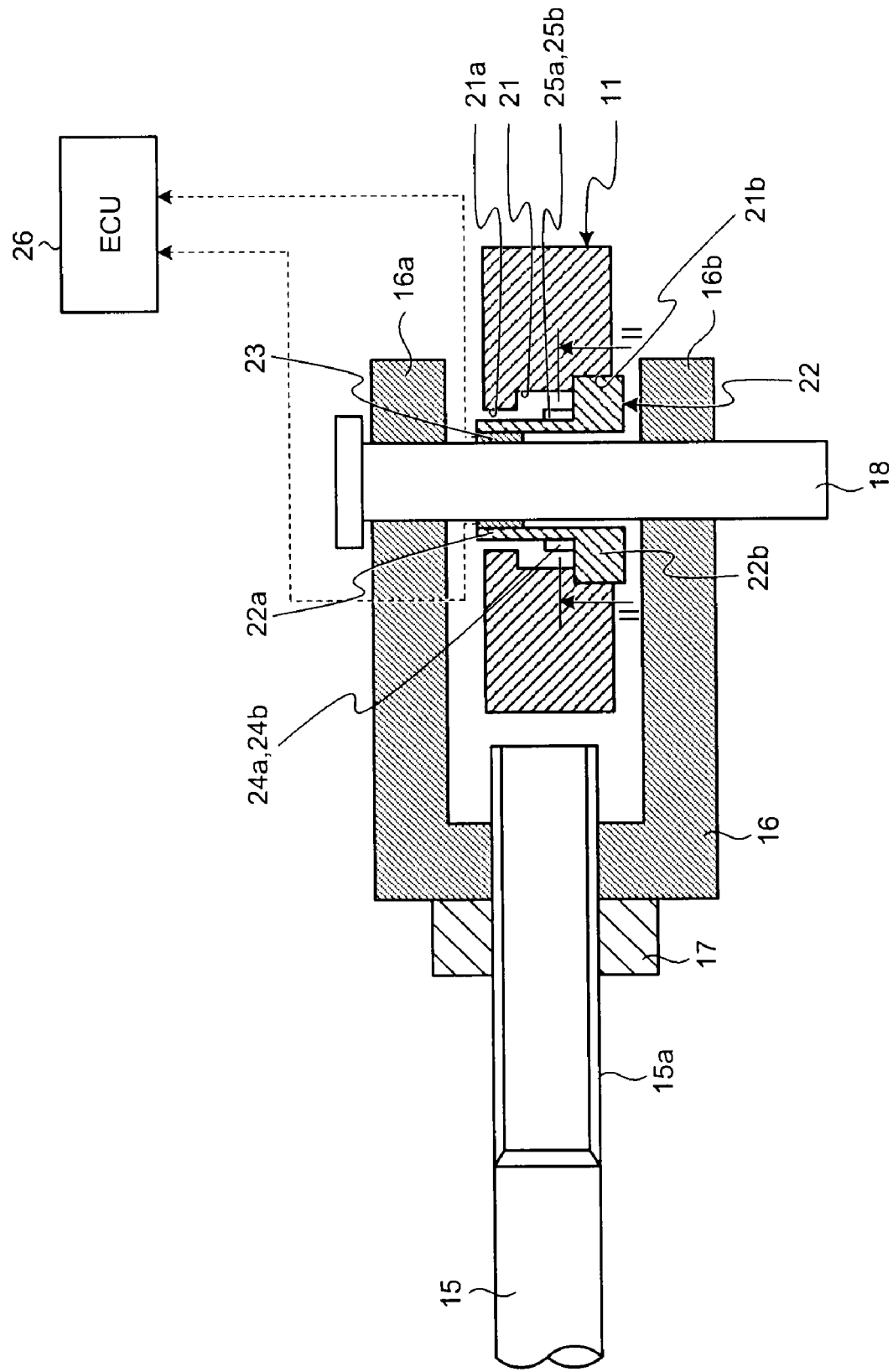
FIG. 1 is a horizontal sectional view (sectional view along line I-I of FIG. 3) of a schematic configuration of a pedal operation amount detecting apparatus according to a first embodiment of the present invention.
Figure 2:
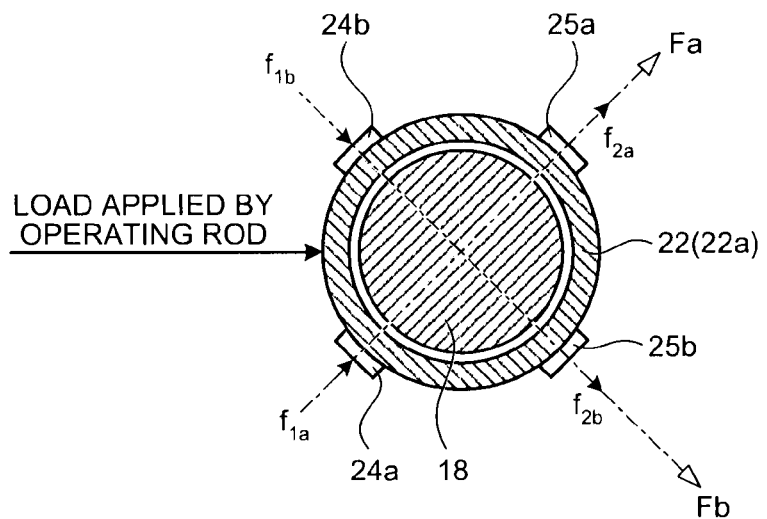
FIG. 2 is a sectional view along line II-II of FIG. 1 showing an arrangement of detectors of the pedal operation amount detecting apparatus according to the first embodiment.
Figure 3:
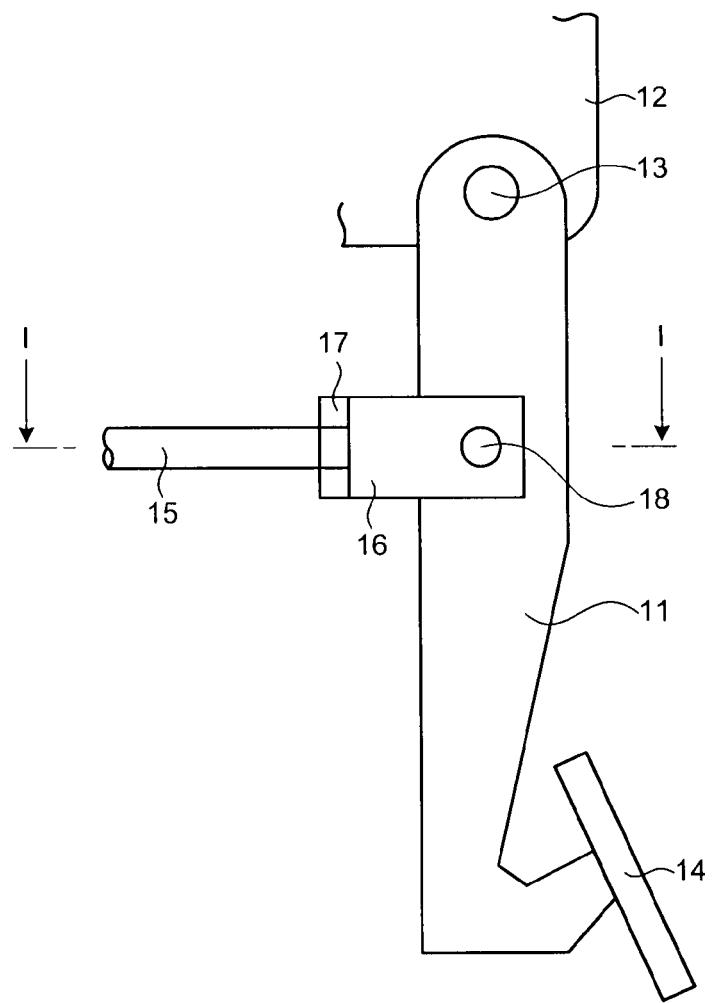
FIG. 3 is a front view of the pedal operation amount detecting apparatus according to the first embodiment.
Figure 4:
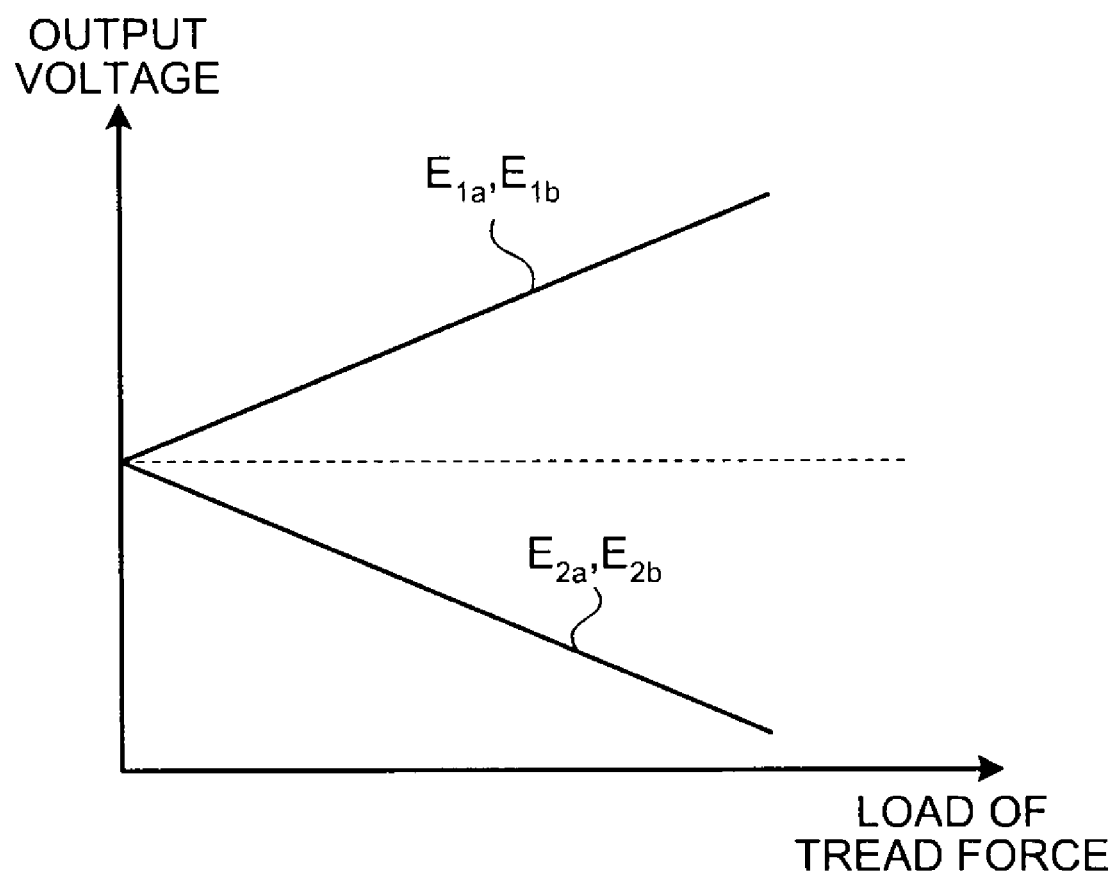
FIG. 4 is a graph of an output voltage of a load detecting unit of the pedal operation amount detecting apparatus according to the first embodiment.

FIG. 1 is a horizontal sectional view (sectional view along line I-I of FIG. 3) of a schematic configuration of a pedal operation amount detecting apparatus according to a first embodiment of the present invention, FIG. 2 is a sectional view along line II-II of FIG. 1 showing an arrangement of detectors in the pedal operation amount detecting apparatus according to the first embodiment, FIG. 3 is a front view of the pedal operation amount detecting apparatus according to the first embodiment, and FIG. 4 is a graph of an output voltage of a load detecting unit of the pedal operation amount detecting apparatus according to the first embodiment.

In the pedal operation amount detecting apparatus of the first embodiment as shown in FIGS. 1 to 3, a brake pedal 11 which serves as an operation pedal has an upper end portion pivotably and suspensibly supported by a supporting shaft 13 on an attachment bracket 12 at a side of a vehicle body and a lower end portion to which a pedal 14 is attached in such a manner that a passenger can tread on the pedal 14. On the other hand, an operating rod 15 has a tip end portion which is connected to a master cylinder and a brake booster (not shown) that are operation targets whose operations control a braking apparatus.

Further, the operating rod 15 has a screw portion 15a formed at a proximal end portion. The screw portion 15a is screwed into a clevis 16, while a locknut 17 is screwed onto the operating rod 15 and brought into contact with the clevis 16, whereby a screwed state of the operating rod 15 (screw portion 15a) relative to the clevis 16 is prevented from being loosened. The clevis 16 has arm portions 16a, 16b. The arm portions 16a and 16b are positioned respectively on two sides of a middle portion of the brake pedal 11 with a predetermined distance therebetween. A connecting shaft 18 penetrates through the brake pedal 11 and the two arm portions 16a and 16b, so as to connect the clevis 16 and the brake pedal 11 in a pivotable manner.

Thus, when the passenger treads on the brake pedal 11, the brake pedal 11 pivots around the supporting shaft 13 and an operation amount (operating force) of the brake pedal 11 is transferred to the operating rod 15 via the connecting shaft 18 and the clevis 16. Then, the operating rod 15 moves in an axial direction so that the brake booster and the master cylinder operate.

In the first embodiment, a connecting member of the present invention that connects the brake pedal 11 and the operating rod 15 is configured as the connecting shaft 18.

The pedal operation amount detecting apparatus of the first embodiment detects a pedal operation amount transmitted to the master cylinder and the brake booster as the pivot operation of the brake pedal 11 is converted into the linear operation of the operating rod 15. The pedal operation amount detecting apparatus of the first embodiment includes a load detecting unit that is arranged between the brake pedal 11 and the connecting shaft 18, that is, the connecting member, to detect a load applied between the brake pedal 11 and the connecting shaft 18, a phase obtaining unit that obtains a phase in a pivoting direction of the brake pedal 11 in the load detecting unit, and a pedal operation amount calculating unit that calculates a pedal operation amount (pedal tread force) based on a load detected by the load detecting unit and a phase obtained by the phase obtaining unit. Here, the load detecting unit detects a load applied on a portion where the brake pedal 11 contacts with the connecting shaft 18.

A connecting hole 21 is formed in the middle portion of the brake pedal 11, and has a circular section whose diameter is larger than the outer diameter of the connecting shaft 18. The connecting hole 21 has a small-diameter portion 21a at one end side in an axial direction (thickness direction of the brake pedal 11) and a large-diameter portion 21b at another end side in the axial direction. A bush 22, which is cylindrical in shape, includes a bush main body 22a whose inner diameter and outer diameter are uniform along an axial direction, and a flange 22b which protrudes outwardly like a ring from one axial end portion of the bush main body 22a and whose outer diameter is uniform along an axial direction. The outer diameter of the flange 22b is set larger than the outer diameter of the bush main body 22a. Of the bush 22, the bush main body 22a works as an elastic body which is deformable according to an external force.

The bush 22 is arranged in the connecting hole 21 of the brake pedal 11 so that the bush main body 22a is loosely fit in the small-diameter portion 21a and the connecting hole 21 with a predetermined gap therebetween, while the flange 22b fits to the large-diameter portion 21b. Thus, the bush 22 is secured to the brake pedal 11 like a single unit. Further, the connecting shaft 18 penetrates the bush 22 secured to the brake pedal 11 with a predetermined gap therebetween and further penetrates through the two arm portions 16a and 16b of the clevis 16. A cylindrical collar 23 is fixed to an inner circumferential surface of the bush main body 22a at one end side in the axial direction of the bush 22. The inner circumferential surface of the collar 23 can contact with the outer circumferential surface of the connecting shaft 18 in a slidable manner.

On the outer circumferential surface of the bush main body 22a of the bush 22, four detectors 24a, 24b, 25a, and 25b as load detecting units are attached so as to contact with the flange 22b on the other end side in the axial direction. In the first embodiment, two detectors 24a and 24b are attached onto the outer circumferential surface of the bush main body 22a at the side where the operating rod 15 is connected. The other two detectors 25a and 25b are attached on the opposite side. Being arranged equiangularly (at 90° intervals) in the circumferential direction, the detectors 24a, 24b, 25a, and 25b can detect the load at a different position on the circumferential direction of the connecting shaft 18.

When the brake pedal 11 is treaded on, against a load applied to the flange 22b of the bush 22, a load of a reactive force is applied to the bush main body 22a of the bush 22 by the operating rod 15 via the clevis 16, the connecting shaft 18, and the collar 23. As a result, the bush main body 22a deforms. At the deformation, the detectors 24a and 24b detect a tensile load while the detectors 25a and 25b detect compressive load.

An electronic control unit (ECU) 26 which serves as the phase obtaining unit and the pedal operation amount calculating unit mentioned earlier receives inputs of results of detection by respective detectors 24a, 24b, 25a, and 25b. The ECU 26 calculates the operation amount of the brake pedal 11, in other words, the pedal tread force, based on the loads detected by the detectors 24a, 24b, 25a, and 25b while taking into consideration the phase difference between respective positions of the detectors 24a, 24b, 25a, and 25b that detect the loads.

When the brake pedal 11 is treaded on, the bush main body 22a deforms from the flange 22b in the bush 22. Therefore, the detectors 24a and 24b detect tensile loads $f_{1a}$ and $f_{1b}$, while the detectors 25a and 25b detect compressive loads $f_{2a}$ and $f_{2b}$. The ECU 26 calculates a pedal tread force F according to a mathematical expression below based on the tensile loads $f_{1a}$ and $f_{1b}$ detected by the detectors 24a and 24b and the compressive loads $f_{2a}$ and $f_{2b}$ detected by the detectors 25a and 25b. In the expression, A represents a conversion coefficient.

$$Fa = f_{2a} - f_{1a}$$

$$Fb = f_{2b} - f_{1b}$$

$$F = A(Fa^2 + Fb^2)^{1/2}$$

In this case, as shown in FIG. 4, when the pedal tread force F increases, output voltages $E_{1a}$ and $E_{1b}$ corresponding respectively to the tensile loads $f_{1a}$ and $f_{1b}$ detected by the detectors 24a and 24b increase while output voltages $E_{2a}$ and $E_{2b}$ corresponding respectively to the compressive loads $f_{2a}$ and $f_{2b}$ detected by the detectors 25a and 25b decrease.

Therefore, as shown in FIGS. 1 to 3, when the passenger treads on the brake pedal 11, the brake pedal 11 pivots around the supporting shaft 13 due to the tread force in a clockwise direction in FIG. 3. Then, the tread force is input to the clevis 16 from the brake pedal 11 via the connecting shaft 18. Further, the tread force is transmitted from the clevis 16 to the operating rod 15 which advances accordingly.

As the bush main body 22a in the bush 22 is displaced according to the tread force input from the brake pedal 11, the detectors 24a and 24b detect the tensile loads, while the detectors 25a and 25b detect the compressive loads. The ECU 26 calculates the pedal tread force of the brake pedal 11 based on the loads detected by the detectors 24a, 24b, 25a, and 25b taking into consideration the phase difference between respective detectors 24a, 24b, 25a, and 25b.

As described above, in the pedal operation amount detecting apparatus of the first embodiment, the brake pedal 11 is pivotably connected to the clevis 16 secured at the end portion of the operating rod 15 via the connecting shaft 18, the bush 22 is arranged between the brake pedal 11 and the connecting shaft 18, the detectors 24a, 24b, 25a, and 25b are attached on the outer circumferential surface of the elastically deformable bush main body 22a of the bush 22, and the ECU 26 calculates the pedal tread force based on the loads detected by the detectors 24a, 24b, 25a, and 25b and the phase difference between respective detectors 24a, 24b, 25a, and 25b.

Hence, when the brake pedal 11 is treaded on, the detectors 24a, 24b, 25a, and 25b detect the load working between the brake pedal 11 and the connecting shaft 18, and the ECU 26 calculates the pedal tread force based on the tensile loads and the compressive loads detected by the detectors 24a, 24b, 25a, and 25b. Therefore, an additional member for transmitting the tread force of the brake pedal 11 to the detectors 24a, 24b, 25a, and 25b is not required, whereby a simplified structure, improved mountainability, and highly-accurate detection of the tread force can be realized.

Further, since the detectors 24a, 24b, 25a, and 25b detect the load working on a portion where the brake pedal 11 and the connecting shaft 18 contact with each other, the detectors 24a, 24b, 25a, and 25b can be easily attached, whereby the simplified structure and improved manufacturability can be realized. Further, when the plural detectors 24a, 24b, 25a, and 25b are arranged at 90° intervals in the circumferential direction of the connecting shaft 18 so as to detect the load at plural different positions in the circumferential direction of the connecting shaft 18, the pedal tread force can be detected with high accuracy regardless of the pivoting angle of the brake pedal 11.

Second Embodiment

Figure 5:
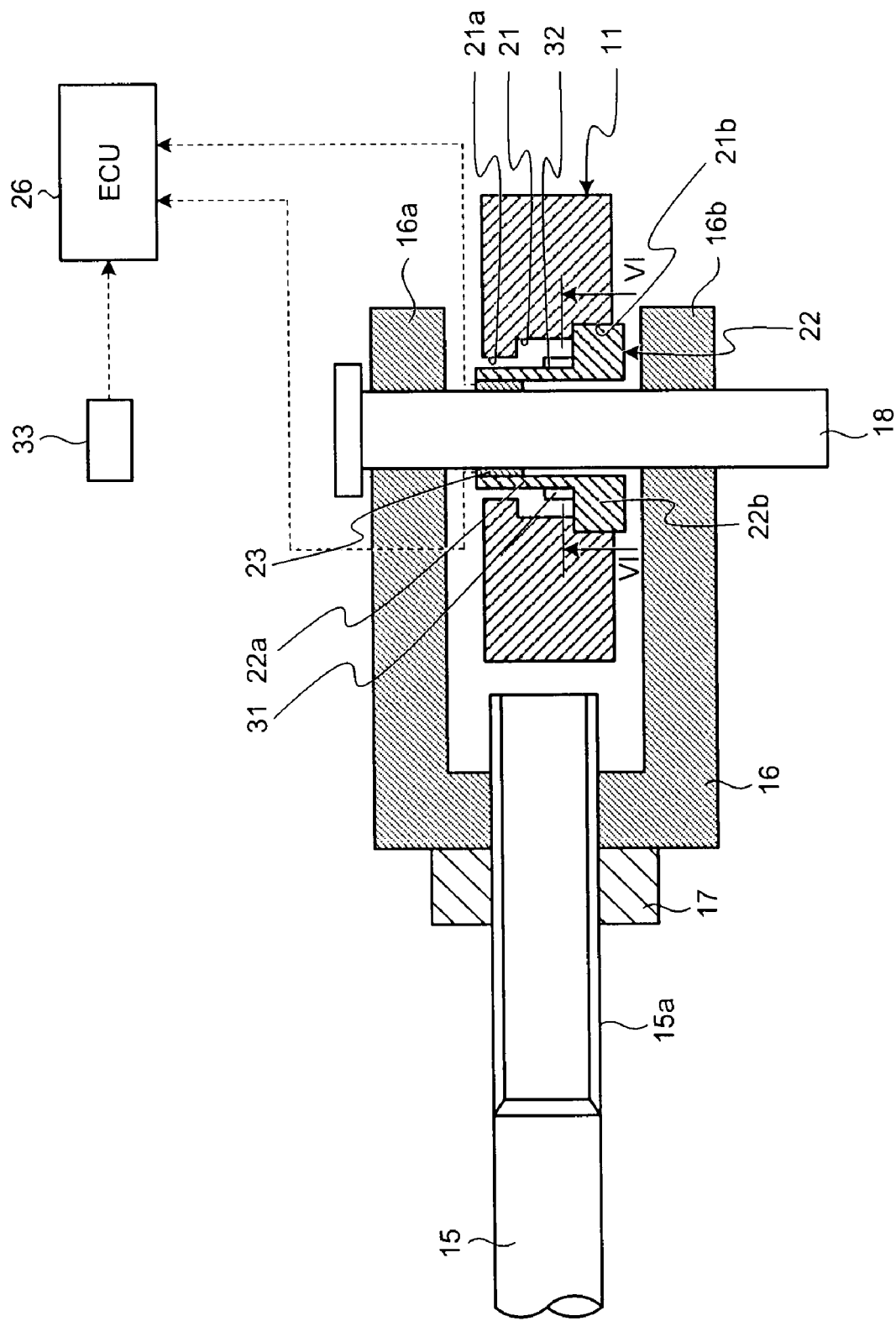
FIG. 5 is a horizontal sectional view of a schematic configuration of a pedal operation amount detecting apparatus according to a second embodiment of the present invention.
Figure 6:
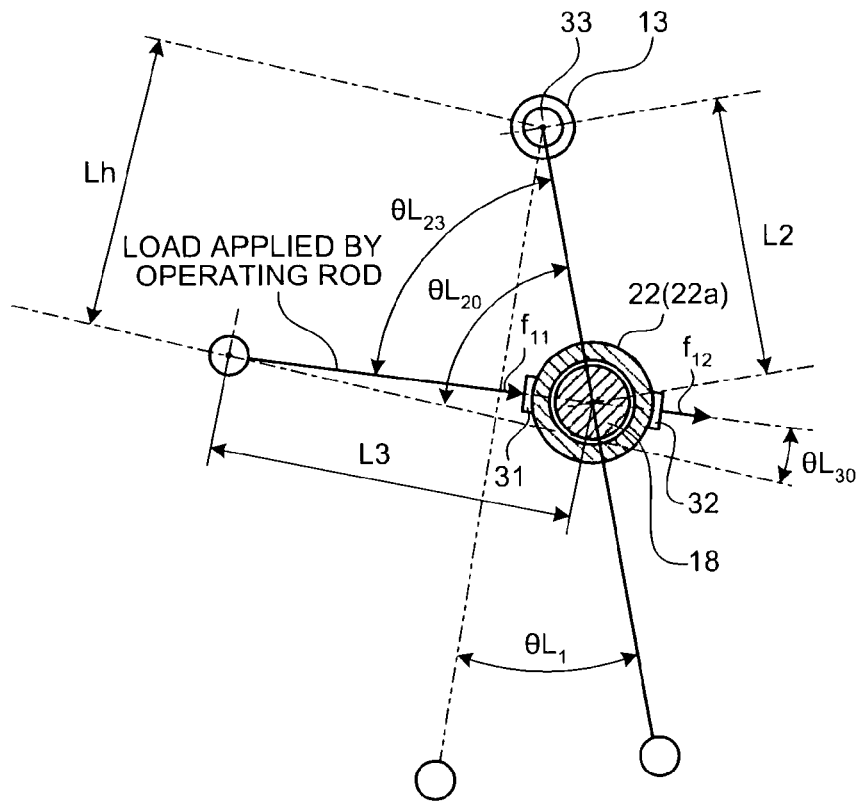
FIG. 6 is a sectional view along line VI-VI of FIG. 5 showing an arrangement of detectors of the pedal operation amount detecting apparatus according to the second embodiment.
Figure 7:
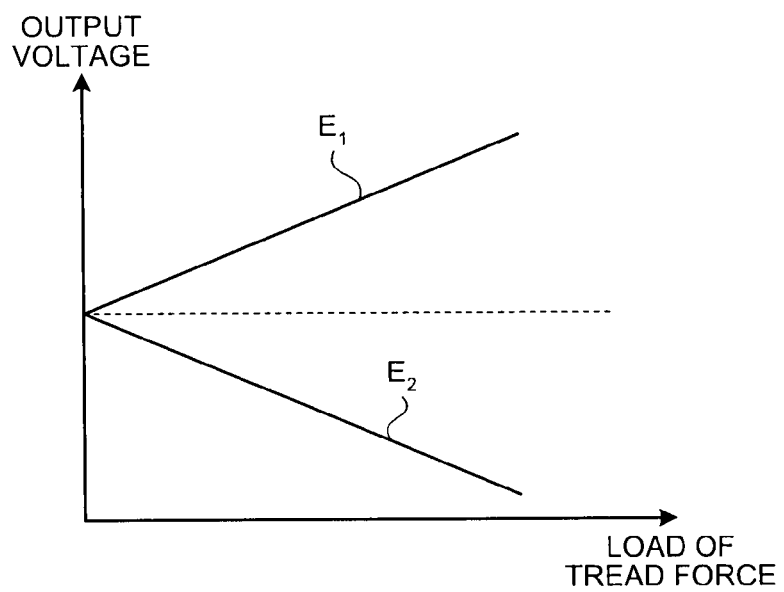
FIG. 7 is a graph of an output voltage of a load detecting unit of the pedal operation amount detecting apparatus according to the second embodiment.

FIG. 5 is a horizontal sectional view of a schematic configuration of a pedal operation amount detecting apparatus according to a second embodiment of the present invention, FIG. 6 is a sectional view along line VI-VI of FIG. 5 showing an arrangement of detectors in the pedal operation amount detecting apparatus according to the second embodiment, and FIG. 7 is a graph of an output voltage of the load detecting unit in the pedal operation amount detecting apparatus of the second embodiment. An element which has the same function as that described with respect to the first embodiment will be denoted by the same reference character and the description thereof will not be repeated.

In the pedal operation amount detecting apparatus of the second embodiment, as shown in FIGS. 5 and 6, the brake pedal 11 is pivotably supported by the supporting shaft 13, while the operating rod 15 has the screw portion 15a screwed into the clevis 16 and secured by the locknut 17. The brake pedal 11 and the operating rod 15 are pivotably connected with each other by the connecting shaft 18 penetrating the two arm portions 16a and 16b of the clevis 16 and the brake pedal 11.

In the second embodiment, the load detecting unit is arranged between the brake pedal 11 and the connecting shaft 18 to detect the load working therebetween, while a pedal pivoting angle detecting unit is arranged to detect a pivoting angle of the brake pedal 11. The pedal operation amount calculating unit calculates the pedal operation amount (pedal tread force) based on a load detected by the load detecting unit, a pedal displacement amount detected by a pedal displacement amount detecting unit, and a phase obtained by the phase obtaining unit.

The connecting hole 21 is formed in the middle portion of the brake pedal 11 and the connecting hole 21 has the small-diameter portion 21a and the large-diameter portion 21b. The bush 22 includes the bush main body 22a and the flange 22b. The bush 22 is arranged in the connecting hole 21 of the brake pedal 11 so that the bush main body 22a is loosely fitted inside the small-diameter portion 21a and the connecting hole 21 with a predetermined gap therebetween, while the flange 22b is fitted to the large-diameter portion 21b. Thus, the bush 22 is secured to the brake pedal 11 like a single unit. Further, the connecting shaft 18 penetrates the two arm portions 16a and 16b of the clevis 16 and further penetrates through the bush 22, which is secured to the brake pedal 11, with a predetermined gap therebetween. On the inner circumferential surface of the bush main body 22a of the bush 22, the cylindrical collar 23 is secured at one end side in the axial direction. The inner circumferential surface of the collar 23 and the outer circumferential surface of the connecting shaft 18 contact with each other in a slidable manner.

Two detectors 31 and 32 serving as the load detecting unit mentioned above are attached on the outer circumferential surface of the bush main body 22a of the bush 22 so as to contact with the flange 22b at the other end side in the axial direction. In the second embodiment, the detector 31 is attached at the side where the operating rod 15 is connected, while the detector 32 is attached on the opposite side on the outer circumferential surface of the bush main body 22a. The detectors 31 and 32 are arranged equiangularly (at 180° interval) in the circumferential direction so as to detect the load at a different position in the circumferential direction of the connecting shaft 18.

When the brake pedal 11 is treaded on, against the load applied to the flange 22b of the bush 22, the load of a reactive force is applied to the bush main body 22a of the bush 22 from the operating rod 15 via the clevis 16, the connecting shaft 18, and the collar 23. Therefore, the bush main body 22a deforms. At this time, while the detector 31 detects the tensile load, the detector 32 detects the compressive load.

Further, on the supporting shaft 13 of the brake pedal 11, a pedal operating angle sensor 33 is attached as the pedal displacement amount detecting unit mentioned above. The pedal operating angle sensor 33 can detect a pivoting angle of the brake pedal 11 when the brake pedal 11 is treaded on. The pedal displacement amount detecting unit of the present invention is not limited to the pedal operating angle sensor 33. For example, the calculation can be performed based on a pedal stroke of the brake pedal 11 detected by a pedal stroke sensor or a piston stroke sensor attached to the master cylinder, or a pressure of the master cylinder.

The electronic control unit (ECU) 26 serving as the phase obtaining unit and the pedal operation amount calculating unit mentioned above receives inputs of results of detection by the detectors 31 and 32, as well as an input of result of detection by the pedal operating angle sensor 33. The ECU 26 calculates the operation amount of the brake pedal 11, in other words, the pedal tread force, based on the load detected by the detectors 31 and 32, the pivoting angle detected by the pedal operating angle sensor 33, and the phase difference between the detectors 31 and 32. In other words, the ECU 26 calculates the pedal tread force of the brake pedal 11 based on the load detected by the detectors 31 and 32, the phase difference calculated based on the positions (phases) of the detectors 31 and 32, and the pivoting angle detected by the pedal operating angle sensor 33.

Specifically, when the brake pedal 11 is treaded on, the bush main body 22a of the bush 22 deforms from the flange 22b, and the detector 31 detects the tensile load $f_{11}$, while the detector 32 detects the compressive load $f_{12}$. Further, the pedal operating angle sensor 33 detects a pivoting angle $\theta L_1$. The ECU 26 calculates the pedal tread force F according to an arithmetic expression below based on the tensile load $f_{11}$ detected by the detector 31, the compressive load $f_{12}$ detected by the detector 32, and the pivoting angle $\theta L_1$ detected by the pedal operating angle sensor 33. Here, $L_2$ represents a distance from the center of the supporting shaft 13 to the center of the connecting shaft 18, $L_3$ represents a distance from a tip end of the operating rod 15 to the center of the connecting shaft 18, Lh represents a height from the center line of the operating rod 15 to the center of the supporting shaft 13, $\theta L_{20}$ represents an angle from the center line of the operating rod 15 to the initial position of the brake pedal 11, $\theta L_{23}$ represents an angle from an axial line along the direction of transmission of the load of reactive force from the operating rod 15 to the initial position of the brake pedal 11, $\theta L_{30}$ represents an angle of difference between the center line of the operating rod 15 and the direction of transmission of the load of reactive force from the operating rod 15, and $\theta L_{OS}$ is a shift angle of the operating rod 15 in a detectable direction in the operation, and A represents a conversion coefficient.

$\theta L_{23} = \theta L_{20} + \theta L_1 + \sin^{-1}(L_h \cdot \sin(\theta L_{20} + \theta L_1)/L_3)$ $\theta L_{OS} = \theta L_{23} - \theta L_{20} - \theta L_{30}$ $F = A(f_{11} - f_{12})/\cos \theta L_{OS}$ As shown in FIG. 7, when the pedal tread force F increases, the output voltage $E_1$ of the tensile load $f_{11}$ detected by the detector 31 increases while the output voltage $E_2$ of the compressive load $f_{12}$ detected by the detector 32 decreases.

Hence, as shown in FIGS. 5 and 6, when the passenger treads on the brake pedal 11 and the brake pedal 11 pivots around the supporting shaft 13 due to the tread force, the tread force is input from the brake pedal 11 to the clevis 16 via the connecting shaft 18 and further transmitted from the clevis 16 to the operating rod 15, whereby the operating rod 15 advances.

At this time, since the bush main body 22a of the bush 22 is displaced by the tread force input from the brake pedal 11, the detector 31 detects the tensile load, the detector 32 detects the compressive load, and the pedal operating angle sensor 33 detects the pivoting angle $\theta L_1$. The ECU 26 calculates the pedal tread force of the brake pedal 11 based on the loads detected by the detectors 31 and 32, and the pivoting angle detected by the pedal operating angle sensor 33.

In the pedal operation amount detecting apparatus according to the second embodiment, the brake pedal 11 and the clevis 16 secured at the end portion of the operating rod 15 are pivotably connected with each other by the connecting shaft 18, the bush 22 is arranged between the brake pedal 11 and the connecting shaft 18, the detectors 31 and 32 are attached on the outer circumferential surface of the elastically deformable bush main body 22a of the bush 22, and the ECU 26 calculates the pedal tread force based on the loads detected by the detectors 31 and 32 and the pivoting angle detected by the pedal operating angle sensor 33.

Hence, when the brake pedal 11 is treaded on, the detectors 31 and 32 detect the load applied between the brake pedal 11 and the connecting shaft 18, the pedal operating angle sensor 33 detects the pivoting angle, and the ECU 26 calculates the pedal tread force based on the tensile load and the compressive load respectively detected by the detectors 31 and 32 and the pivoting angle detected by the pedal operating angle sensor 33. Thus, an additional member is not required for transmitting the tread force of the brake pedal 11 to the detectors 31 and 32, whereby the simplified structure, improved mountainability, and highly-accurate detection of the tread force can be realized.

Further, since plural detectors, namely, the two detectors 31 and 32 are arranged in the circumferential direction of the connecting shaft 18 at 180° intervals and the loads are detected at plural different positions along the circumferential direction of the connecting shaft 18, the pedal tread force can be detected with high accuracy regardless of the pivoting angle of the brake pedal 11. When the two detectors 31 and 32 are arranged and detected loads are corrected according to the pivoting angle detected by the pedal operating angle sensor 33, the pedal tread force can be detected with high accuracy.

Third Embodiment

Figure 8:
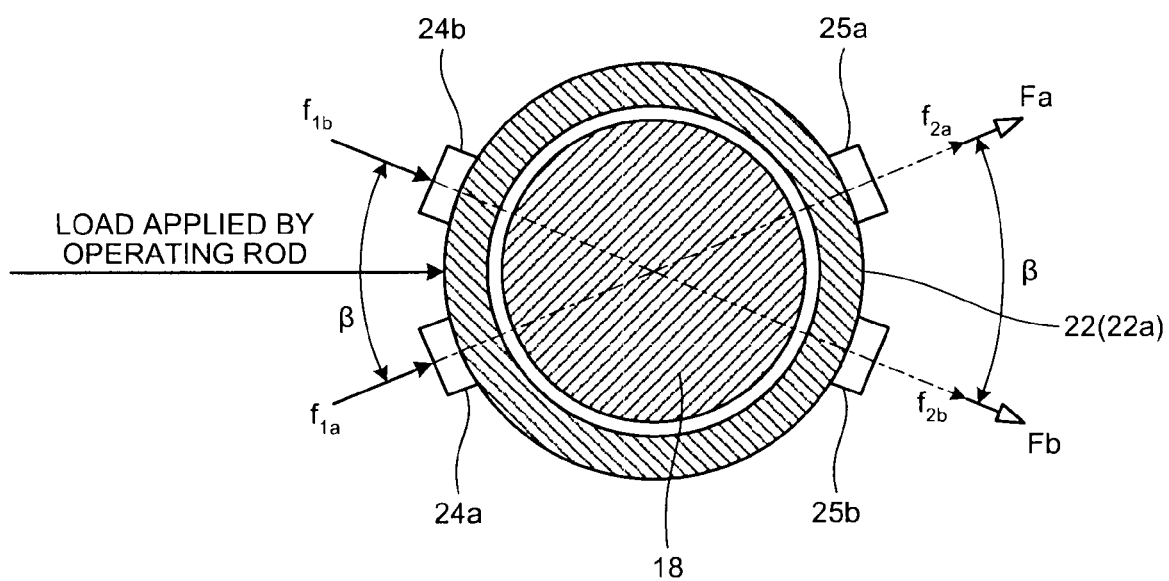
FIG. 8 is a sectional view of a portion connecting a brake pedal with an operating rod in a pedal operation amount detecting apparatus according to a third embodiment of the present invention.
Figure 9A:
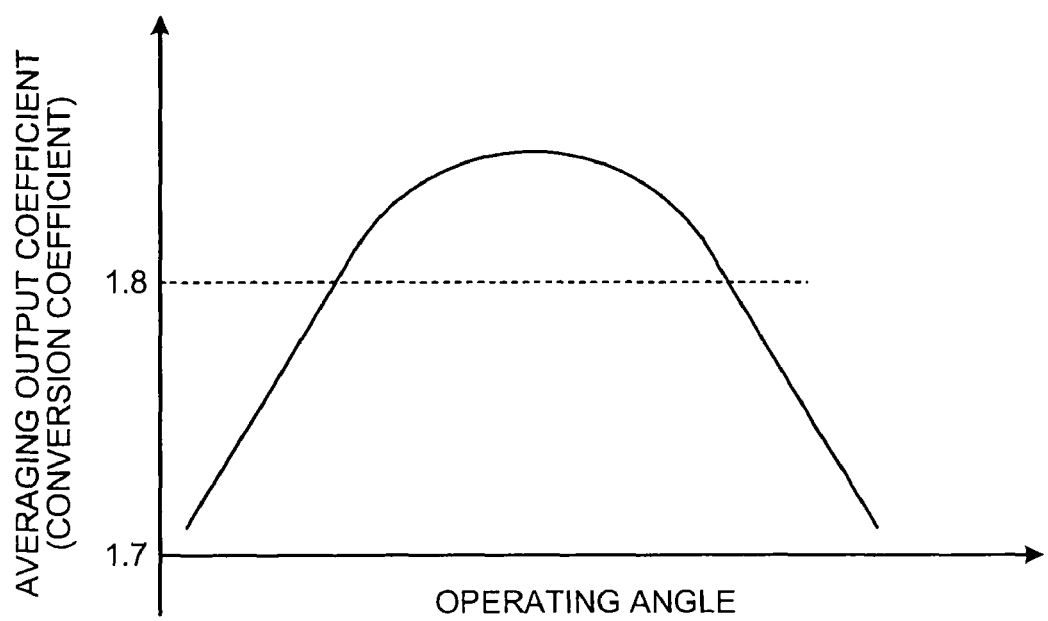
FIG. 9A is a graph of an averaging output coefficient for calculating a pedal tread force based on root-mean-first.
Figure 9B:
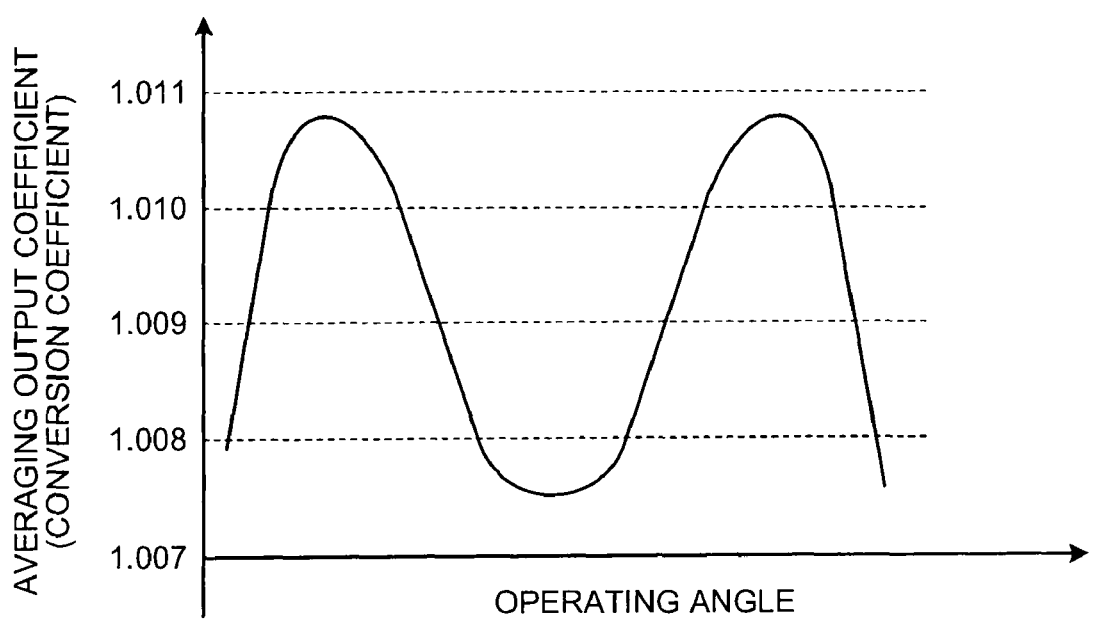
FIG. 9B is a graph of an averaging output coefficient for calculating a pedal tread force based on root-mean-eighth.

FIG. 8 is a sectional view of a portion where the brake pedal and the operating rod are connected with each other in a pedal operation amount detecting apparatus according to a third embodiment of the present invention, FIG. 9A is a graph representing an averaging output coefficient employed for calculating a pedal tread force using root-mean-first. FIG. 9B is a graph representing an averaging output coefficient employed for calculating a pedal tread force using root-mean-eighth. An overall configuration of the pedal operation amount detecting apparatus according to the third embodiment is substantially the same as that of the first embodiment described above, and will be described with reference to FIGS. 1 and 3. Element with a similar function to that described relative to the first embodiment will be denoted by the same reference character and the description thereof will not be repeated.

In the pedal operation amount detecting apparatus according to the third embodiment, as shown in FIGS. 1, 3, and 8, the upper end portion of the brake pedal 11 is pivotably and suspensibly supported at the side of the vehicle body. The operating rod 15 has the screw portion 15a screwed into the clevis 16 and secured by the locknut 17. The clevis 16 has the two arm portions 16a and 16b arranged with a predetermined distance therebetween. The operating rod 15 and the clevis 16 are pivotably connected with each other by the connecting shaft 18 which penetrates the brake pedal 11 and the two arm portions 16a and 16b.

The pedal operation amount detecting apparatus according to the third embodiment serves to detect the pedal operation amount which is transmitted as the pivot operation of the brake pedal 11 is converted into the linear operation of the operating rod 15. The pedal operation amount detecting apparatus includes the load detecting unit that is arranged between the brake pedal 11 and the connecting shaft 18 to detect a load applied between the brake pedal 11 and the connecting shaft 18, the phase obtaining unit that obtains a phase in the pivoting direction of the brake pedal 11 in the load detecting unit, and a pedal operation amount calculating unit that calculates the pedal operation amount (pedal tread force) based on the load detected by the load detecting unit and the phase obtained by the phase obtaining unit. The load detecting unit detects a load applied to a portion where the brake pedal 11 and the connecting shaft 18 contact with each other.

The connecting hole 21 is formed in the middle portion of the brake pedal 11. The connecting hole 21 has the small-diameter portion 21a at one end side and the large-diameter portion 21b at the other end side. The bush 22 has the bush main body 22a and the flange 22b formed on the bush main body 22a. The bush 22 is arranged in the connecting hole 21 of the brake pedal 11 so that the bush main body 22a is loosely fitted in the small-diameter portion 21a and the connecting hole 21 with a predetermined gap therebetween while the flange 22b is fitted to the large-diameter portion 21b, whereby the bush 22 is secured to the brake pedal 11 like a single unit. Further, the connecting shaft 18 penetrates the two arm portions 16a and 16b of the clevis 16, and further penetrates through the bush 22 secured to the brake pedal 11. The collar 23 is secured to the inner circumferential surface of the bush 22 so that the inner circumferential surface of the collar 23 contacts with the outer circumferential surface of the connecting shaft 18 in a slidable manner.

On the outer circumferential surface of the bush main body 22a of the bush 22, four detectors 24a, 24b, 25a, and 25b are attached as the load detecting unit mentioned above so as to be in contact with the flange 22b at the other end side in the axial direction. In the third embodiment, the two detectors 24a and 24b are attached on the outer circumferential surface of the bush main body 22a at the side where the operating rod 15 is connected, while the two detectors 25a and 25b are attached at the opposite side. Two detectors 24a and 24b are arranged respectively on opposite sides across a load-input position of the operating rod 15 along a circumferential direction of the connecting shaft 18. An arrangement angle β between the two detectors 24a and 24b is equal to or larger than a maximum pivot operating angle α of the brake pedal 11. Further, the two detectors 25a and 25b are arranged symmetrically with the detectors 24a and 24b about the center of the connecting shaft 18. An arrangement angle β between the two detectors 25a and 25b is equal to or larger than the maximum pivot operating angle α of the brake pedal 11. In the third embodiment, the maximum pivot operating angle α of the brake pedal 11 is approximately 30°, while the arrangement angle β between the detectors 25a and 25b, and between the detectors 24a and 24b is 45°, whereby the loads can be detected at different positions in the circumferential direction of the connecting shaft 18.

Hence, when the brake pedal 11 is treaded on, while the load is applied to the flange 22b of the bush 22, a load of a reactive force is applied to the bush main body 22a of the bush 22 from the operating rod 15 via the clevis 16, the connecting shaft 18, and the collar 23. Then, the bush main body 22a deforms. The detectors 24a and 24b detect the tensile load, while the detectors 25a and 25b detect the compressive load.

The ECU 26 calculates the operation amount of the brake pedal 11, in other words, the pedal tread force, based on the loads detected by the detectors 24a, 24b, 25a, and 25b while taking into consideration the phase difference of the positions of the detectors 24a, 24b, 25a, and 25b that detect the loads.

When the brake pedal 11 is treaded on, the bush main body 22a of the bush 22 deforms from the flange 22b. Then, the detectors 24a and 24b detect the tensile loads $f_{1a}$ and $f_{1b}$, while the detectors 25a and 25b detect the compressive loads $f_{2a}$ and $f_{2b}$. The ECU 26 calculates the pedal tread force F according to the arithmetic expression shown below based on the tensile loads $f_{1a}$ and $f_{1b}$ detected by the detectors 24a and 24b, and the compressive loads $f_{2a}$ and $f_{2b}$ detected by the detectors 25a and 25b. Here, A represents a conversion coefficient.

Further, in the third embodiment, the ECU 26 calculates the pedal tread force F according to a root mean of plural order of which the conversion coefficient A is minimum, more specifically, root-mean-eighth, based on the loads detected by the detectors 24a, 24b, 25a, and 25b at four positions and phase difference between the respective detectors 24a, 24b, 25a, and 25b.

$Fa = f_{2a} - f_{1a}$, $Fb = f_{2b} - f_{1b}$, $F = A(Fa^8 + fb^8)^{1/8}$.

When the pedal tread force F is calculated according to the root-mean-first based on the loads detected at four positions respectively by the detectors 24a, 24b, 25a, and 25b and the phase differences therebetween, the averaging output coefficient (conversion coefficient) A fluctuates significantly within the range of 1.7 to 1.85 according to the operating angle of the brake pedal 11 as shown in FIG. 9-1. On the other hand, when the pedal tread force F is calculated according the root-mean-eighth based on the loads detected respectively at four positions by the detectors 24a, 24b, 25a, and 25b, and the phase differences therebetween, the averaging output coefficient (conversion coefficient) A converges within the range of 1.0075 to 1.011 according to the operating angle of the brake pedal 11 as shown in FIG. 9-2.

Hence, as shown in FIGS. 1, 2, and 8, when the passenger treads on the brake pedal 11, the brake pedal 11 pivots around the supporting shaft 13 due to the tread force. Then, the tread force is input to the clevis 16 from the brake pedal 11 via the connecting shaft 18, and transmitted to the operating rod 15 which advances accordingly. Here, as the bush main body 22a of the bush 22 deforms according to the tread force input by the brake pedal 11, the detectors 24a and 24b detect the tensile loads, while the detectors 25a and 25b detect the compressive loads. The ECU 26 calculates the pedal tread force of the brake pedal 11 based on the loads detected by the detectors 24a, 24b, 25a, and 25b while taking into consideration the phase differences between the respective detectors 24a, 24b, 25a, and 25b.

In the pedal operation amount detecting apparatus according to the third embodiment, the brake pedal 11 and the clevis 16 secured at the end portion of the operating rod 15 are pivotably connected with each other via the connecting shaft 18, the bush 22 is arranged between the brake pedal 11 and the connecting shaft 18, two pairs of detectors 24a and 24b, and 25a and 25b are arranged on the outer circumferential surface of the bush 22 respectively on opposite sides across the load input position of the operating rod 15 along the circumferential direction of the connecting shaft 18 so that the arrangement angle β therebetween is equal to or larger than the maximum pivot operating angle α of the brake pedal 11, and the ECU 26 calculates the pedal tread force based on the loads detected by the detectors 24a, 24b, 25a, and 25b and the phase differences therebetween.

Hence, when the brake pedal 11 is treaded on, the detectors 24a, 24b, 25a, and 25b detect the loads applied between the brake pedal 11 and the connecting shaft 18, and the ECU 26 calculates the pedal tread force based on the tensile loads and the compressive loads detected by the detectors 24a, 24b, 25a, and 25b. Thus, an additional member is not required for transmitting the tread force of the brake pedal 11 to the detectors 24a, 24b, 25a, and 25b, whereby the simplified structure, improved mountainability, and highly accurate detection of the tread force can be realized.

Further, in the pedal operation amount detecting apparatus according to the third embodiment, the pedal tread force F is calculated according to the root-mean-eighth where the conversion coefficient A is minimum based on the loads detected at four positions by the detectors 24a, 24b, 25a, and 25b and the phase differences between the respective detectors 24a, 24b, 25a, and 25b. Hence, the fluctuation caused by the operating angle of the brake pedal, in other words, by the phase difference between the respective detectors 24a, 24b, 25a, and 25b is reduced, whereby the pedal tread force can be detected with even higher accuracy.

In the embodiments described above, the bush 22 is arranged between the brake pedal 11 and the connecting shaft 18, and the detectors 24a, 24b, 25a, 25b, 31, and 32 are arranged on the bush 22. Alternatively, however, the detectors 24a, 24b, 25a, 25b, 31, and 32 may be arranged between the connecting shaft 18 and the operating rod 15, for example, between the clevis 16 and the connecting shaft 18, or between the clevis 16 and the operating rod 15.

Further, in the embodiments described above, the detectors 24a, 24b, 25a, 25b, 31, and 32 are respectively arranged at plural different positions in the circumferential direction of the connecting shaft 18 so as to detect the loads. Such, however, is not a limiting example. For example, it is possible to arrange the bush rotatably around the outer circumferential portion of the connecting shaft while making the bush rotatable together with the connecting hole of the brake pedal like a single unit. In other words, it is possible to make the section of the bush in a shape such as an oval other than a perfect circle so that a gap can be formed by a curved surface or a flat surface between the bush and the connecting hole of the brake pedal, and arrange the detectors (load detecting unit) therein. Though the detectors (load detecting unit) are arranged at plural different positions along the circumferential direction of the connecting shaft, the circumferential direction is not limited to the circumferential direction of a perfect circle, and the detectors can be arranged at any position as far as the positions are slightly displaced in the circumferential direction relative to the radial direction of the connecting shaft.

INDUSTRIAL APPLICABILITY

As can be seen from the foregoing, the pedal operation amount detecting apparatus according to the present invention includes a load detecting unit that is arranged between the operation pedal and the connecting member or between the connecting member and the operating rod so as to detect the load applied therebetween, and calculates the pedal operation amount based on the load detected by the load detecting unit, so as to realize simplified structure, improved mountainability, and highly accurate detection of the operation amount, and thus is suitable for any pedal operation amount detecting apparatus.

The invention claimed is:

1. A pedal operation amount detecting apparatus that detects a pedal operation amount which is transmitted to an operation target unit as a pivot operation of an operation pedal is converted into a linear operation of an operating rod, comprising:
   a connecting member that connects the operation pedal and the operating rod;
   a load detecting unit that is arranged between the operation pedal and the connecting member or between the connecting member and the operating rod to detect a load applied therebetween, such that the load detecting unit detects a load at plural different positions in a circumferential direction of the connecting member;
   a phase obtaining unit that obtains a phase in a pivoting direction of the operation pedal in the load detecting unit; and
   a pedal operation amount calculating unit that calculates the pedal operation amount based on the load detected by the load detecting unit and the phase obtained by the phase obtaining unit.

2. The pedal operation amount detecting apparatus according to claim 1, wherein
   the load detecting unit detects a load applied to a portion where the operation pedal and the connecting member contact with each other or a portion where connecting member and the operating rod contact with each other.

3. The pedal operation amount detecting apparatus according to claim 1, wherein
   the connecting member is a connecting shaft connecting the operation pedal and a clevis secured at an end portion of the operating rod,
   the load detecting unit detects the load at the plural different positions in a circumferential direction of the connecting shaft,
   the phase obtaining unit obtains a phase difference at the plural different positions where the load is detected, and
   the pedal operation amount calculating unit calculates the pedal operation amount based on the loads at the plural positions and the phase difference therebetween.

4. The pedal operation amount detecting apparatus according to claim 3, wherein
   the load detecting unit is arranged at plural positions at 90° intervals in the circumferential direction of the connecting shaft.

5. The pedal operation amount detecting apparatus according to claim 1, wherein
   the phase obtaining unit includes a pedal displacement amount detecting unit which detects an amount of displacement of the operation pedal,
   the pedal operation amount calculating unit calculates the pedal operation amount based on the load detected by the load detecting unit, the pedal displacement amount detected by the pedal displacement amount detecting unit, and the phase obtained by the phase obtaining unit.

6. The pedal operation amount detecting apparatus according to claim 5, wherein
   the connecting member is a connecting shaft connecting the operation pedal and the clevis secured at the end portion of the operating rod, and
   the load detecting unit is arranged at plural positions at 180° intervals in the circumferential direction of the connecting shaft.

7. The pedal operation amount detecting apparatus according to claim 3, wherein
   the load detecting unit is arranged at least at two positions on opposite sides across a load input position of the operating rod in the circumferential direction of the connecting shaft with an arrangement angle therebetween equal to or larger than a maximum pivot operating angle of the operation pedal.

8. The pedal operation amount detecting apparatus according to claim 7, wherein
   the load detecting unit is arranged at two positions with an arrangement angle therebetween being equal to or smaller than 45° in the circumferential direction of the connecting shaft, and
   the pedal operation amount calculating unit calculates the pedal operation amount according to root-mean-eighth based on the load detected by the load detecting unit at plural positions and the phase difference obtained by the phase obtaining unit.

9. The pedal operation amount detecting apparatus according to claim 3, wherein
   the clevis includes a first arm portion and a second arm portion such that operation pedal is disposed between the first and second arm portions of the clevis, and
   the connecting shaft penetrates through the operation pedal, the first arm portion, and the second arm portion so that the clevis and the operation pedal are pivotal with respect to each other.

10. The pedal operation amount detecting apparatus according to claim 9, wherein
   the operation pedal includes a connecting hole that includes a first diameter portion and a second diameter portion,
   the first diameter portion has a smaller diameter in an axial direction than the second diameter portion, and the connecting shaft penetrates through the connecting hole.

11. The pedal operation amount detecting apparatus according to claim 10, wherein a bush is arranged in the connecting hole such that a main body of the bush is loosely fit in the first diameter portion of the connecting hole and a flange of the bush fits the second diameter portion of the connecting hole, a cylindrical collar is fixed to an inner circumferential surface of the main body of the bush, and an inner circumferential surface of the cylindrical collar contacts an outer circumferential surface of the connecting shaft in a slidable manner.

12. The pedal operation amount detecting apparatus according to claim 11, wherein the load detecting unit is provided on an outer circumferential surface of the main body of the bush.

* * * * *